United States Patent
Fisher, Jr. et al.

(10) Patent No.: US 10,919,192 B2
(45) Date of Patent: *Feb. 16, 2021

(54) NARROW FLAKE COMPOSITE FIBER MATERIAL COMPRESSION MOLDING

(71) Applicant: The Boeing Company, Chicago, IL (US)

(72) Inventors: Edward McMurray Fisher, Jr., Huntsville, AL (US); Dennis Lynn Coad, Madison, AL (US); Brian Allen Carter, Stanford Drive, AL (US); Glenn David Hardin, Huntsville, AL (US); Jon Paul Thurber, Huntsville, AL (US); Douglas Eugene Bailey, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,133

(22) Filed: Nov. 1, 2019

(65) Prior Publication Data
US 2020/0061881 A1    Feb. 27, 2020

Related U.S. Application Data

(62) Division of application No. 13/356,132, filed on Jan. 23, 2012, now Pat. No. 10,603,821.

(51) Int. Cl.
*B29C 43/34* (2006.01)
*B29C 70/46* (2006.01)
(Continued)

(52) U.S. Cl.
CPC .............. *B29C 43/34* (2013.01); *B29C 31/08* (2013.01); *B29C 70/14* (2013.01); *B29C 70/18* (2013.01);
(Continued)

(58) Field of Classification Search
None
See application file for complete search history.

(56) References Cited

U.S. PATENT DOCUMENTS 3,646,610 A    2/1972  Jackson et al.
3,705,837 A *  12/1972 Breslauer ............... B28B 1/525
                                                          428/403
(Continued)

FOREIGN PATENT DOCUMENTS

EP    0376472 A2    7/1990
EP    916477 A1    5/1999
(Continued)

OTHER PUBLICATIONS

Office Action for related Japanese Application No. 2013-010233; report dated Jun. 6, 2017.
(Continued)

*Primary Examiner* — Atul P. Khare
(74) *Attorney, Agent, or Firm* — von Briesen & Roper, s.c.

(57) ABSTRACT

Methods provide for creating a three-dimensional random fiber orientation in a composite component. According to embodiments described herein, narrow flakes are created from a unidirectional composite fiber tape and poured into a reservoir of a mold, creating a three-dimensional random fiber orientation of the narrow flakes within the reservoir. At least a majority of the narrow flakes have an aspect ratio of length to width of at least 6:1. The narrow flakes are heated and compressed to fill the mold and create the composite component. The three-dimensional random fiber orientation of the narrow flakes within the reservoir is maintained as the narrow flakes are pushed through the mold, creating consistent, uniform strength characteristics throughout the resulting composite component.

20 Claims, 5 Drawing Sheets

(51) Int. Cl.
  *B29C 70/54* (2006.01)
  *B29C 70/42* (2006.01)
  *B29C 70/18* (2006.01)
  *B29C 31/08* (2006.01)
  *B29C 70/14* (2006.01)
  *B32B 5/08* (2006.01)
  *B29B 11/16* (2006.01)

(52) U.S. Cl.
  CPC .............. *B29C 70/42* (2013.01); *B29C 70/46* (2013.01); *B29C 70/545* (2013.01); *B29B 11/16* (2013.01); *B29C 2793/0081* (2013.01); *Y10T 428/24132* (2015.01)

(56) References Cited

U.S. PATENT DOCUMENTS

| | | | |
|---|---|---|---|
| 4,287,020 | A | 9/1981 | Moore |
| 4,339,490 | A * | 7/1982 | Yoshioka ................ B29C 70/00 428/213 |
| 4,370,390 | A | 1/1983 | Burk |
| 4,925,719 | A | 5/1990 | Staneluis et al. |
| 4,983,451 | A | 1/1991 | Sugino et al. |
| 5,151,322 | A | 9/1992 | Kimoto et al. |
| 5,569,424 | A | 10/1996 | Amour et al. |
| 6,521,152 | B1 | 2/2003 | Wood et al. |
| 6,924,021 | B1 | 8/2005 | Colegrove et al. |
| 7,198,739 | B2 | 4/2007 | La Forest et al. |
| 7,960,674 | B2 | 6/2011 | Boursier et al. |
| 8,298,359 | B2 | 10/2012 | Imparato Sabato Inserra et al. |
| 8,450,225 | B2 | 5/2013 | Restuccia et al. |
| 8,709,319 | B2 | 4/2014 | Gideon et al. |
| 8,709,321 | B2 | 4/2014 | Gideon et al. |
| 8,962,737 | B2 | 2/2015 | Pilpel et al. |
| 2005/0161686 | A1 | 7/2005 | Oohata et al. |
| 2006/0125156 | A1 | 6/2006 | Woolhouse |
| 2010/0104847 | A1 | 4/2010 | Ciavatta |
| 2011/0011975 | A1 | 1/2011 | Boursier |
| 2011/0111172 | A1 | 5/2011 | Gideon |
| 2013/0047403 | A1 * | 2/2013 | Gideon ................ B29C 70/465 29/428 |
| 2013/0075947 | A1 | 3/2013 | Bartel et al. |

FOREIGN PATENT DOCUMENTS

| | | |
|---|---|---|
| EP | 1167001 A1 | 1/2002 |
| EP | 2179838 A1 | 4/2010 |
| JP | H02143810 A | 6/1990 |
| JP | H03097759 A | 4/1991 |
| JP | 2507565 B2 | 6/1996 |
| JP | 2002331521 A | 11/2002 |
| JP | 201000851 A | 5/2010 |
| WO | 8909123 A | 10/1989 |
| WO | 9925540 A1 | 5/1999 |

OTHER PUBLICATIONS

Black Sara, "Redesigning for Simplicity and Economy," http://www.compositesworld.com/articles/redesigning-for-simplicity-and-economy, Jan. 1, 2012.

Pan Y, et al., "Analysis of 3D Random Chopped Fiber Reinforced Composites Using FEM and Random Sequential Adsorption", ScienceDirect, Computational Materials Science 43 (2008) 450-461, Feb. 2008.

Extended European Search Reported dated Apr. 29, 2013 in EP Application No. 13151911.8.

* cited by examiner

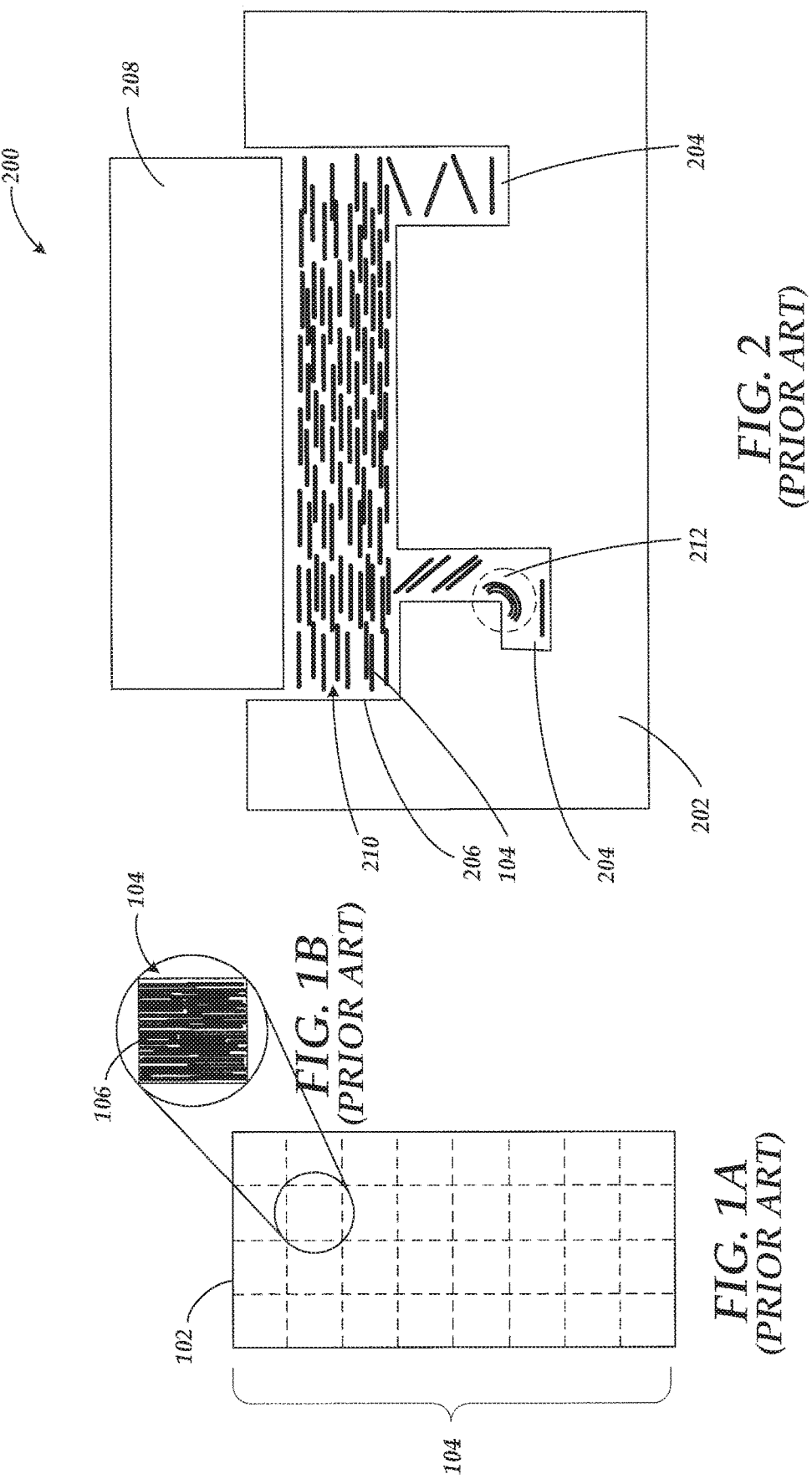

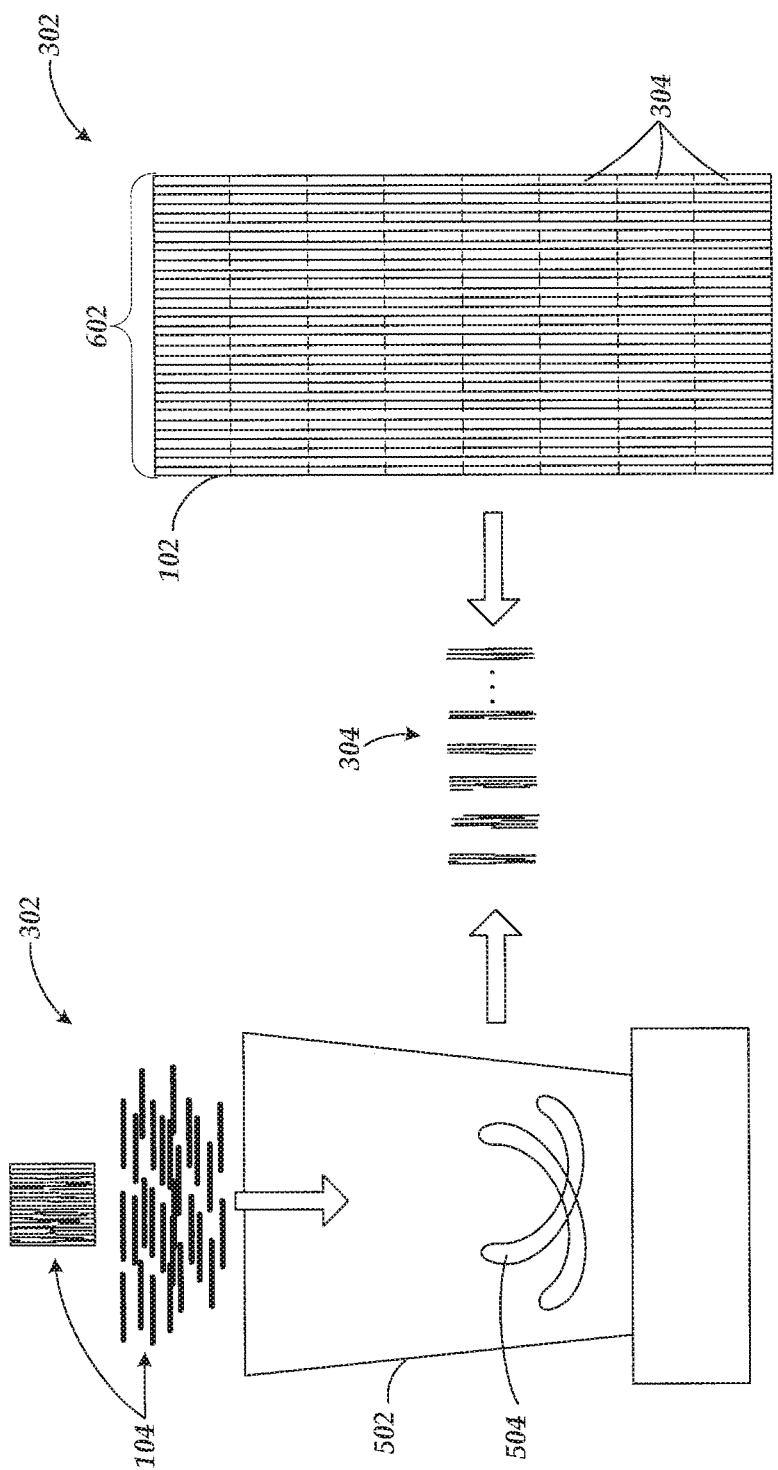

NARROW FLAKE COMPOSITE FIBER MATERIAL COMPRESSION MOLDING

BACKGROUND

Composite components are often manufactured using thermoset or thermoplastic materials, which may be formed into tapes or sheets having carbon fibers that are conventionally arranged in a unidirectional configuration. The resulting unidirectional tape may be cut into smaller pieces, or flakes, which are typically square or approximately square. These flakes are placed in a mold reservoir where heat and pressure are applied to force the flakes into all cavities of the mold. Once cured, the resulting component is removed from the mold.

This conventional compression molding technique may create an undesirable variance in the strength of resulting components according to the arrangement of the flakes as they are pushed throughout the mold. As the flakes are deposited in the mold reservoir, they tend to stack up such that they lay on top of one another with the large flat sides of the flakes abutting one another, similar to the manner in which books would stack on top of one another if tossed into a pile on a flat surface. This common stacking phenomenon may be referred to as laminar stacking. As the laminar stacks of flakes are pushed throughout the mold, the orientation of the stacks may change, but the flakes ultimately remain substantially stacked. When subjected to tensional loads in the through-thickness direction (or z-direction if the flakes are oriented in an x-y plane), the flakes are inclined to separate or delaminate since there are relatively no fibers oriented in the through-thickness direction. The result of this laminar stacking orientation being pushed through the component mold is a potentially weak area in the final component.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods provide for creating a three-dimensional random fiber orientation in a composite component. According to one aspect of the disclosure provided herein, a method includes pouring narrow flakes of a unidirectional composite fiber tape into a mold reservoir. At least a majority of the narrow flakes have an aspect ratio of 6:1 or higher. The narrow flakes within the reservoir are heated and compressed to push the narrow flakes throughout the mold and create the desired composite component.

According to another aspect, a method of creating a three-dimensional random fiber orientation in a composite component includes transforming a unidirectional thermoplastic tape into a number of narrow flakes. At least a majority of the narrow flakes have an aspect ratio of at least 6:1. The narrow flakes are poured into a reservoir of a mold so that an orientation of the narrow flakes includes a three-dimensional random fiber orientation. The narrow flakes within the reservoir are heated and compressed to fill the mold and create the composite component having the three-dimensional random fiber orientation.

According to yet another aspect, a method for creating a three-dimensional random fiber orientation in a composite component may include slitting a unidirectional thermoplastic tape into a number of narrow tape ribbons. The narrow tape ribbons are cut to create a number of narrow flakes having an aspect ratio of at least 6:1. The narrow flakes are poured into a reservoir of a mold, heated, and compressed to fill the mold and create the composite component.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 1A is a top view of an example of a conventional composite fiber tape;

FIG. 1B is a top view of an example of a conventional flake cut from a composite fiber tape;

FIG. 2 is a cross-sectional view of a conventional compression molding system showing the laminar stacking of conventional flakes within a reservoir of a mold;

FIG. 5 is a front view of a narrow flake creation mechanism that includes a blending device having one or more chopping blades according to one embodiment presented herein;

FIG. 6 is a front view of a narrow flake creation mechanism that includes a device and/or process for slitting and cutting composite fiber tape or conventional flakes into narrow flakes according to one embodiment presented herein;

DETAILED DESCRIPTION

Figure 4:
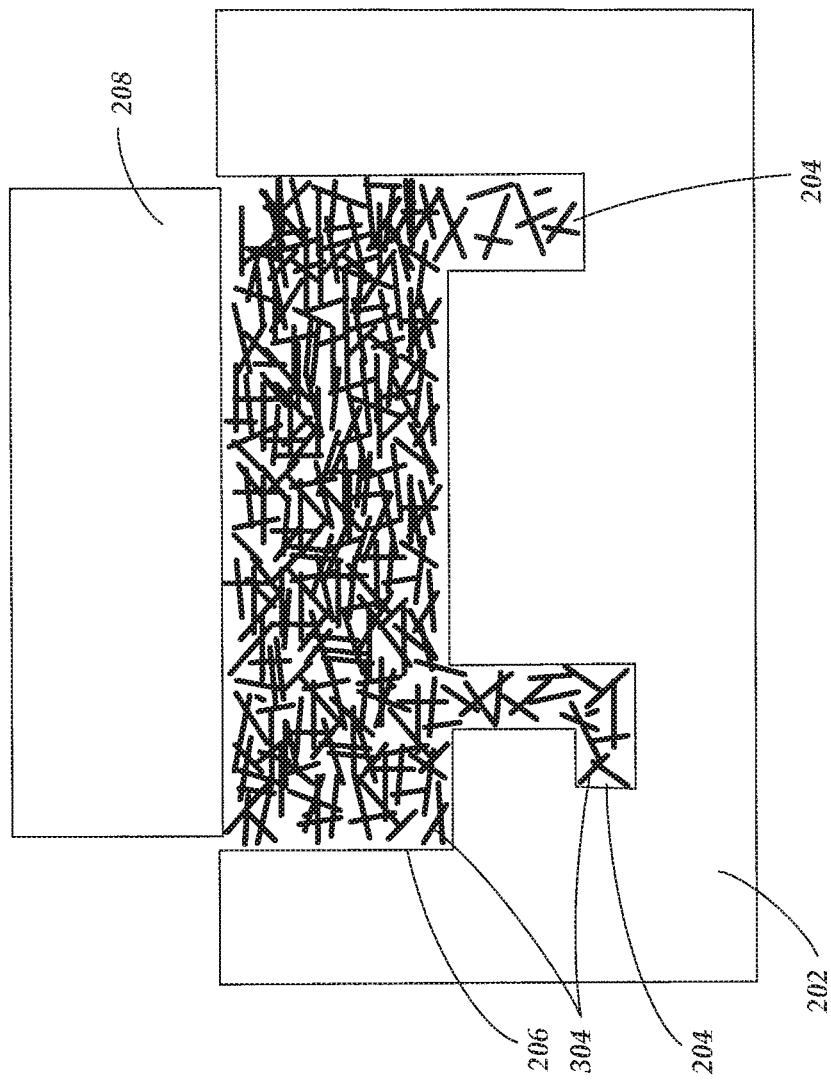
FIG. 4 is a cross-sectional view of a compression molding system showing the three-dimensional random fiber orientation of narrow flakes within a reservoir of a mold according to various embodiments presented herein.

The following detailed description is directed to methods for creating a three-dimensional random fiber orientation in a composite component. As discussed briefly above, conventional composite components made using compression molding techniques often include undesirable areas of laminar stacking of the composite flakes that have been pushed through the mold. The resulting component may include weak areas corresponding to areas within the mold with substantial laminar stacking, particularly when those areas are subjected to shear or tension forces during use of the composite component.

Utilizing the concepts described herein, composite components may be manufactured in a manner that results in a consistent, three-dimensional random fiber orientation of composite fibers throughout the component. In doing so, the strength of the composite components may be increased, and most importantly, the strength of the components may be consistent and predictable throughout the component and all other components manufactured using the same technique and fibers. As will be described in detail below, the three-dimensional randomness may be achieved utilizing composite fiber materials that are configured as narrow flakes having an aspect ratio of at least 6:1. These relatively narrow flakes are not biased towards laminar stacking when poured into a mold reservoir for compression molding. The random flake orientation is maintained throughout the mold as the narrow flakes are compressed and pushed through the mold.

In the following detailed description, references are made to the accompanying drawings that form a part hereof, and which are shown by way of illustration, specific embodiments, or examples. Referring now to the drawings, in which like numerals represent like elements through the several figures, the creation of three-dimensional random fiber orientation in composite components will be described. Turning to FIG. 1A, a top view of a composite fiber tape 102 is shown. As previously mentioned, thermoplastic materials may be formed into a composite fiber tape 102 that may be composed of carbon fibers that are arranged in a unidirectional configuration or orientation. The composite fiber tape 102 may be cut into flakes 104, as indicated by the broken lines. It should be appreciated that the composite fiber tape 102 shown in FIG. 1A depicts a limited number of flakes 104 for illustrative purposes only. Conventionally, the flakes 104 may be cut into approximate squares, or flakes having a length to width aspect ratio of approximately 1:1. If not 1:1, the aspect ratio of the flakes 104 is often less than 2:1 or any other "low aspect ratio" value, producing a substantially wide flake relative to the length of the flake.

A close up view of a flake 104 is shown in FIG. 1B to illustrate the unidirectional configuration of the fibers 106. The fibers 106 and associated resin may include suitable thermoplastic materials, including but not limited to PEKK, PEI, PEEK, PPE and PPS. As seen in the figure, the fibers 106 may be oriented substantially parallel to one another, creating the unidirectional configuration of the composite fiber tape 102 and of the corresponding flakes 104.

FIG. 2 shows a cross-sectional view of a conventional compression molding system 200 utilizing a number of flakes 104 of the composite fiber tape 102. The conventional compression molding system 200 includes a mold 202 with any number of component cavities 204. The component cavities 204 are shaped and sized according to the desired component to be created with the mold 202. The mold 202 may include any number of passageways and turns feeding the various component cavities 204. A ram 208 is used to press the flakes 104 throughout the passageways to fill the component cavities 204 while applying heat to melt the composite material.

Before the compression, a reservoir 206 of the mold 202 is filled with a quantity of flakes 104 approximately equivalent to the mass of the resulting component to be created during the compression molding process. As described above and seen in FIG. 2, a problem with conventional techniques lies in the laminar stacking 210 phenomena that is prevalent with flakes 104 having a conventional low aspect ratio dimensional characteristic. As the flakes 104 are poured or otherwise placed into the reservoir 206, the flakes 104 tend to rest relatively flat on top of one another to create the laminar stacking 210. The laminar stacking 210 of the flakes 104 results in a substantially two-dimensional orientation of flakes 104 and corresponding fibers 106.

When heat and pressure are applied to the flakes 104, the laminar stacking 210 configuration of the flakes 104 may be pushed throughout the component cavities 204 of the mold 202. This heat and compression process may bend or alter the planar orientation or the flakes 104 or stacks of flakes 104 as the flakes 104 are pressed around corners of the passageways, however, the laminar stacking 210 may continue to exist in one or more areas of the mold 202. The laminar stacking 210 within the component cavities 204 may result in potential weak areas 212 of the component if subjected to shear or tension forces that act to pull the flakes apart or otherwise delaminate the stacks of flakes. It should again be noted that FIG. 2 has been significantly simplified to illustrate an example of the laminar stacking 210 of the flakes 104 and resulting weak area 212.

Figure 3:
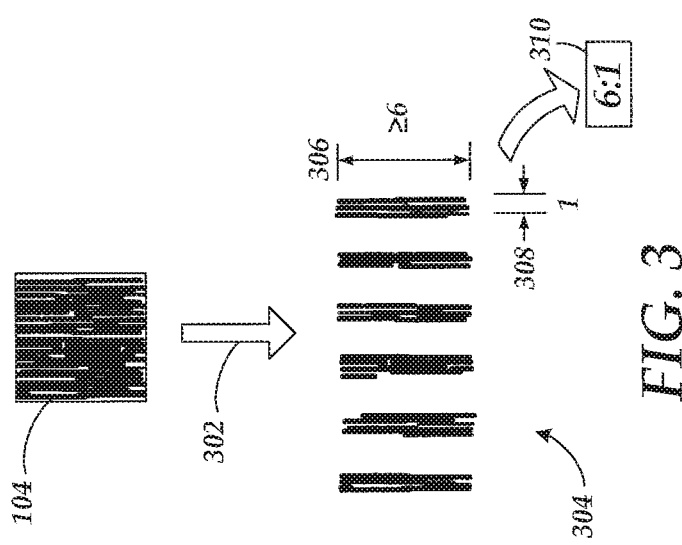
FIG. 3 is a top view of a conventional flake transformation into a number of narrow flakes according to various embodiments presented herein.

Turning to FIG. 3, one embodiment of the present disclosure will be described. To prevent the laminar stacking 210 of the flakes 104, the concepts described herein transform the flakes 104 or the corresponding composite fiber tape 102 into narrow flakes 304 via a narrow flake creation mechanism 302. Embodiments of the narrow flake creation mechanism 302 will be described below with respect to FIG. 6. The narrow flakes 304 have a length 306 and a width 308 that provides a desired aspect ratio 310 that will ultimately provide the three-dimensional random fiber orientation of the narrow flakes 304 when poured into a reservoir 206 of a mold 202 as described in greater detail below. The desired aspect ratio 310 may be substantially greater than the aspect ratio associated with conventional flakes 104. As described above, conventional aspect ratios may be approximately 1:1 to 4:1. According to various embodiments, the desired aspect ratio may be 6:1 or greater. In other words, according to one embodiment, the length 306 of a narrow flake 304 may be at least six times the width 308 of the narrow flake 304. According to one embodiment, a desired aspect ratio 310 is approximately 8:1. For example, the narrow flakes 304 may have ½ inch lengths 306 and $\frac{1}{16}^{th}$ inch widths 308, which would give the narrow flakes 304 an aspect ratio of 8:1.

Referring to FIG. 4, when narrow flakes 304 are poured into the reservoir 206 of a mold 202, the desired aspect ratio 310 allows the narrow flakes 304 to substantially rest in a three-dimensional random fiber orientation. In this three-dimensional random fiber orientation, the fibers 106 within each narrow flake 304, which are substantially unidirectional, are not substantially parallel with the fibers 106 within a majority of adjacent narrow flakes 304. In other words, the narrow flakes 304 extend in all directions, through all planes, rather than the laminar stacking 210 that is prevalent with conventional flakes 104. In doing so, the three-dimensional random fiber orientation of the narrow flakes 304 is substantially maintained as the narrow flakes 304 are heated and pushed throughout the passageways of the mold 202 and into the component cavities 204.

The resulting component has isotropic strength characteristics in that the component does not have any resulting weak areas 212 in specific directions due to laminar stacking 210. In addition, the resulting component may experience an increase in strength characteristics as compared to an identical component that is compression molded using the same mold 202 and flakes 104 described above. The reason lies in that the narrow flakes 304 position fibers 106 in all directions consistently throughout the component. Interlacing the fibers 106 in three dimensions prior to applying heat and pressure to push the narrow flakes 304 throughout the mold 202 ensures a random fiber orientation distribution throughout the mold 202 and resulting component after cooling.

FIG. 5 shows one embodiment in which the narrow flake creation mechanism includes a blending device 502 having one or more chopping blades 504. According to this embodiment, the composite fiber tape 102 may be cut into flakes 104 as described above. The flakes 104 are then placed in a blending device 502, such as an industrial blender or other device in which one or more chopping blades 504 strike the flakes 104. Upon contact with the flakes 104, the force of the impact from the chopping blades 504 fractures the flakes 104 along an axis parallel to the fibers 106, which creates multiple flakes 104 having the same length 306, but shorter width 308 than the original flakes 104. The fracturing of the flakes 104 continues until the majority of the flakes 104 have a sufficiently small width 308 corresponding to the desired aspect ratio 310, creating the narrow flakes 304.

Utilizing this narrow flake creation mechanism 302 creates narrow flakes 304 that may not be entirely uniform. As an example, while a majority of the narrow flakes 304 have an aspect ratio of 8:1, other narrow flakes may have aspect ratios between 6:1 to 10:1. This non-uniformity of narrow flakes may or may not be desirable depending on the particular application. As long as the aspect ratio 310 of approximately 75% of the narrow flakes 304 is approximately 6:1 or higher, the narrow flakes 304 will fill the reservoir 206 of the mold 202 in a three-dimensional random fiber orientation. According to one embodiment, at least 75% of the narrow flakes within the resulting component have an aspect ratio of at least 6:1, resulting in a substantially three-dimensional random fiber orientation throughout the component.

According to an alternative embodiment depicted in FIG. 6, the narrow flake creation mechanism 302 includes a device and/or process for slitting and cutting the composite fiber tape 102 or the flakes 104 into the narrow flakes 304. According to one embodiment, the composite fiber tape 102 may be slit into narrow tape ribbons 602 having the desired width 308 of the narrow flakes 304. After slitting the composite fiber tape 102, the narrow tape ribbons 602 are cut or chopped into the desired length 306 as indicated by the broken lines, resulting in the creation of the narrow flakes 304.

It should be appreciated that any appropriate equipment for slitting and cutting the thermoplastic or other composite fiber material may be utilized. Moreover, the composite fiber tape 102 may be cut at the desired lengths corresponding to the length 306 of the narrow flakes 304 prior to slitting the tape into the desired widths 308 to create the narrow flakes 304. The composite fiber tape 102 may be alternatively stamped to simultaneously make lengthwise and widthwise cuts to create the narrow flakes 304. According to an alternative embodiment, the flakes 104 having a relatively low aspect ratio may be created from the composite fiber tape 102 using conventional techniques. The flakes 104 may then be slit at appropriate locations to create the narrow flakes 304 having an aspect ratio of approximately 6:1 or higher. Although multiple embodiments of the narrow flake creation mechanism 302 have been described, it should be understood that the narrow flake creation mechanism 302 may include any machine or process that is operative to slit, chop, cut, or otherwise transform a composite fiber tape 102 and/or corresponding flakes 104 into narrow flakes 304 having the desired aspect ratio 310.

One potential advantage to slitting and cutting the composite fiber tape 102 into the narrow flakes 304 rather than fracturing the flakes 104 into narrow flakes 304 is that all or any portion of the narrow flakes 304 may be cut into the precise lengths 306 and widths 308 desired. This control over the exact characteristics of the narrow flakes 304 to be included within the composite component allows for the consistent creation of uniform components having the desired strength properties. According to one embodiment utilizing this slitting and cutting process, substantially all of the narrow flakes within the resulting component have an aspect ratio of at least 6:1, resulting in a substantially three-dimensional random fiber orientation throughout the component.

Depending on the characteristics of the component being made, it may be advantageous to utilize a subset of narrow flakes 304 having specific lengths 306, widths 308, and corresponding aspect ratios 310 in one location of the mold, while utilizing a second subset of narrow flakes 304 having lengths 306, widths 308, and corresponding aspect ratios 310 that are different from the first subset. In other words, according to various embodiments, the composite fiber tape 102 may be cut into a number of narrow tape ribbons 602, and then further cut into a number of narrow flakes 304 all having equivalent dimensional attributes or varying dimensional attributes.

It should be appreciated that the process and components described herein, while described with respect to thermoplastic materials, may conceivably be applicable to other materials having characteristics that would allow for the creation of the narrow flakes 304 and for the flow of the three-dimensional random fiber orientation throughout the mold 202 upon application of heat and compression to the three-dimensionally oriented narrow flakes 304 within the reservoir 206. It should also be noted that the embodiments described herein may not be applicable to thermoset and materials in which the characteristics of the material provide for a cross-linking to occur with the resin of the flakes at above-freezing temperatures, providing a resulting viscosity and flake properties that prevent a three-dimensional random fiber orientation to be pushed throughout all component cavities 204 of a complex mold during heating. In contrast, with thermoplastic and similar materials, production costs are minimized since the creation of the narrow flakes 304 may occur at room temperature or above freezing, i.e., at or above 50 degrees F. The component creation process may then be performed using mechanical pressure and heat, after which the resulting component may be ready for use or further processing after cooling.

Figure 7:
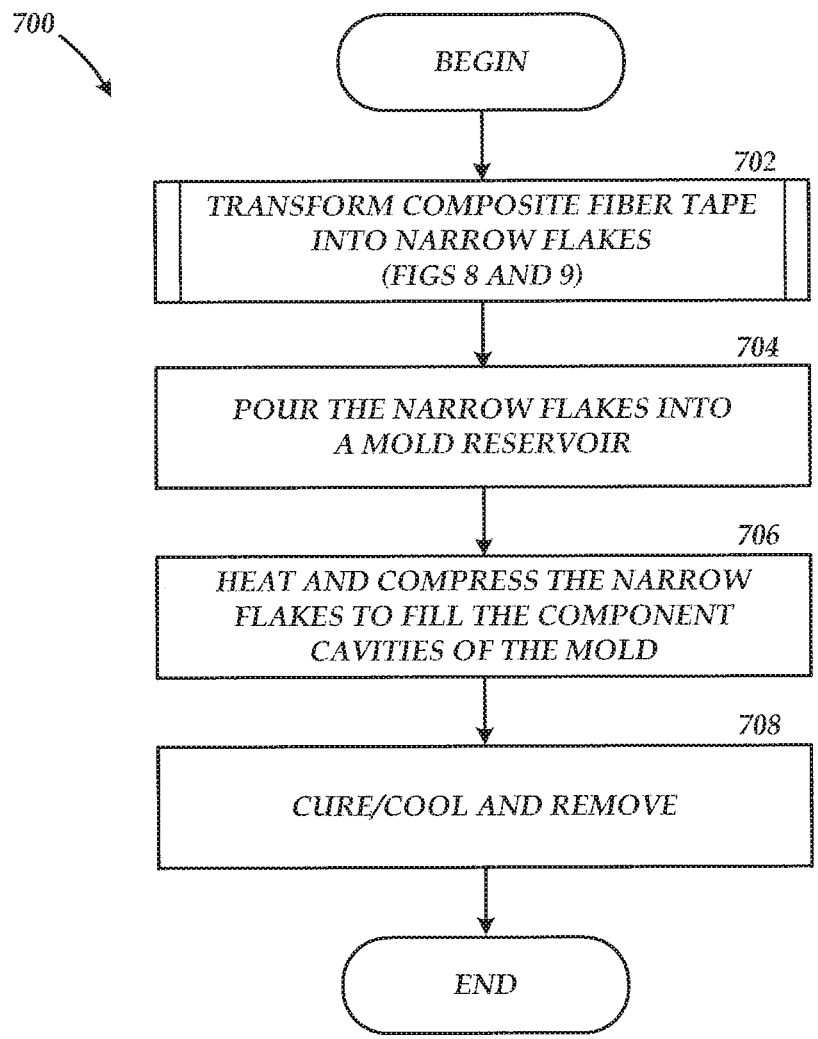
FIG. 7 is a process flow diagram illustrating a method for creating a three-dimensional random fiber orientation in a composite component according to various embodiments presented herein.

Turning now to FIG. 7, an illustrative routine 700 for creating a three-dimensional random fiber orientation in a composite component will now be described in detail. It should be appreciated that more or fewer operations may be performed than shown in the figures and described herein. These operations may also be performed in a different order than those described herein.

The routine 700 begins at operation 702, where the composite fiber tape 102 is transformed into narrow flakes 304. Two different embodiments for creating the narrow flakes 304 from the composite fiber tape 102 will be described below with respect to FIGS. 8 and 9. The narrow flakes 304 may be created with aspect ratios 310 of at least 6:1. From operation 702, the routine 700 continues to operation 704, where the narrow flakes 304 are poured into the reservoir 206 of the mold 202. Because the narrow flakes 304 have the desired aspect ratio 310 of at least 6:1, the narrow flakes 304 come to rest in a three-dimensional random fiber orientation within the reservoir 206. It should be noted that the narrow flakes 304 may be uncoupled to adjacent narrow flakes 304 when poured into the reservoir 206. In other words, unlike thermoset applications in which flakes are tacky at room temperatures, and generally at above-freezing temperatures, the narrow flakes 304 are loose or individually free to fall into the reservoir 206 at above-freezing temperatures to create the three-dimensional random fiber orientation that is desired since the narrow flakes 304 are not bound or otherwise attracted to adjacent narrow flakes 304.

The routine 700 continues from operation 704 to operation 706, where heat and pressure are applied to the narrow flakes 304 within the reservoir 206 to push the narrow flakes 304 throughout the component cavities 204 of the mold 202. Because of the three-dimensional random fiber orientation of the narrow flakes 304 within the reservoir 206, this random orientation is spread throughout the mold 202, ensuring consistent strength characteristics throughout the resulting component. At operation 706, the component at least partially cools and solidifies before being removed from the mold 202, and the routine 700 ends.

Figure 8:
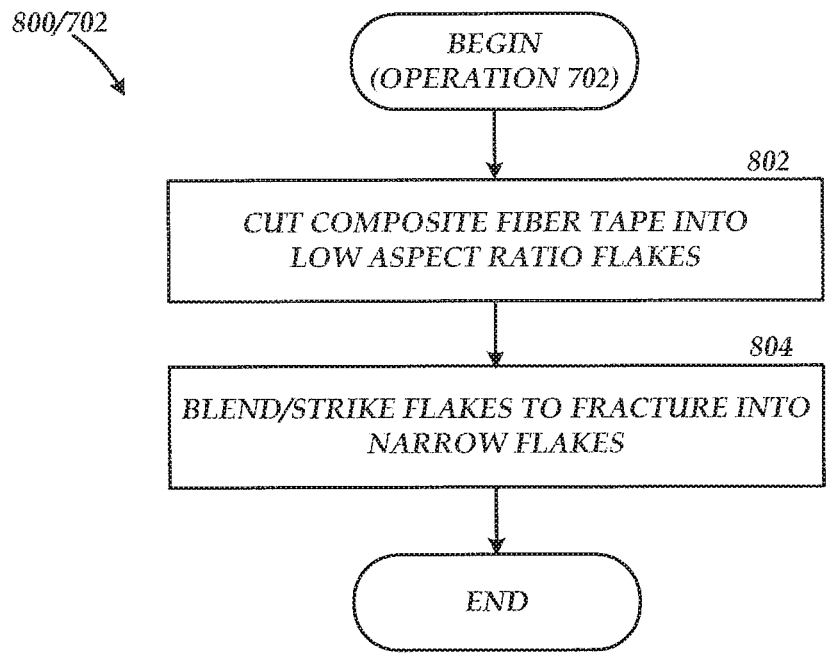
FIG. 8 is a process flow diagram illustrating a method for transforming composite fiber tape into narrow flakes according to various embodiments presented herein.

FIG. 8 shows an illustrative routine 800 corresponding to operation 702 of FIG. 7 for transforming the composite fiber tape 102 into narrow flakes 304. An example of this embodiment is shown in FIG. 5 with respect to utilizing a blending device 502 to fracture the flakes 104 into narrow flakes 304. The routine 800 begins at operation 802, where composite fiber tape 102 is cut into flakes 104, or low aspect ratio flakes. At operation 804, the flakes 104 are blended within the blending device 502 to allow the chopping blades 504 to strike the flakes 104, fracturing the flakes 104 between fibers 106 to create the narrow flakes 304 having the desirable aspect ratios 310, and the routine 800 ends. It should be appreciated that this embodiment is not limited to the use of a blending device 502. Rather, any equipment configured to strike or otherwise apply a sufficient force to the flakes 104 to fracture the flakes 104 into narrow flakes 304 may be used.

Figure 9:
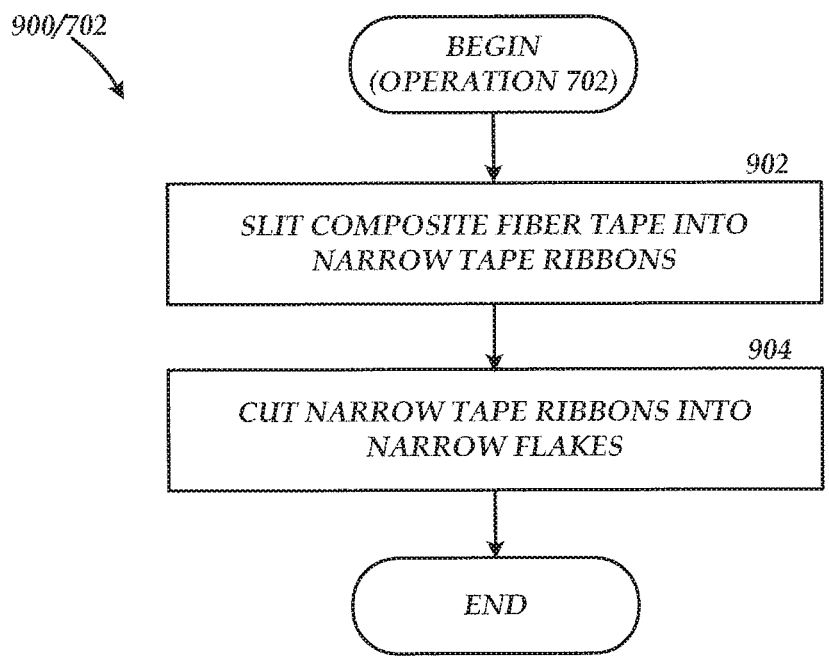
FIG. 9 is a process flow diagram illustrating an alternative method for transforming composite fiber tape into narrow flakes according to various embodiments presented herein.

FIG. 9 shows an illustrative alternative routine 900 corresponding to operation 702 of FIG. 7 for transforming the composite fiber tape 102 into narrow flakes 304. An example of this embodiment is shown in FIG. 6 with respect to slitting and cutting a composite fiber tape 102 into the narrow flakes 304 having one or more desired aspect ratios 310. The routine 900 begins at operation 902, where composite fiber tape 102 is slit into narrow tape ribbons 602. The narrow tape ribbons 602 may be of one or more widths corresponding to the desired widths 308 of the narrow flakes 304 being created. At operation 904, the narrow tape ribbons 602 are cut into one or more lengths corresponding to the desired lengths 306 of the narrow flakes 304 being created, and the routine 900 ends.

Based on the foregoing, it should be appreciated that technologies for creating a three-dimensional random fiber orientation in a composite component have been presented herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method of creating a composite component having random three-dimensional fiber orientation therethrough, the method comprising:
   cutting a unidirectional composite fiber tape into a plurality of flakes;
   fracturing the plurality of flakes along a fiber axis to create a plurality of narrow flakes, wherein a majority of the plurality of narrow flakes has a length to width aspect ratio of at least 6:1;
   pouring the plurality of narrow flakes of the unidirectional composite fiber tape into a mold reservoir shaped according to the composite component, wherein each of the plurality of narrow flakes is uncoupled to adjacent ones of the narrow flakes during said pouring, and wherein the plurality of narrow flakes settle randomly in three dimensions by virtue of the aspect ratio of at least 6:1;
   heating the plurality of narrow flakes within the mold reservoir; and
   compressing the plurality of narrow flakes within the mold reservoir through the mold reservoir to create the composite component, wherein the random three-dimensional orientation is maintained throughout said heating and compressing.

2. The method of claim 1, wherein:
   cutting the unidirectional composite fiber tape into the plurality of flakes comprises cutting the unidirectional composite fiber tape into the plurality of flakes so as to have an aspect ratio of less than 6:1.

3. The method of claim 1, wherein the unidirectional composite fiber tape comprises a unidirectional thermoplastic tape.

4. The method of claim 1, wherein fracturing the plurality of flakes along the fiber axis thereof to create the plurality of narrow flakes comprises:
   blending the plurality of flakes in a blending device having a plurality of chopping blades until the plurality of narrow flakes have the aspect ratio of at least 6:1.

5. The method of claim 1, wherein fracturing the plurality of flakes along the fiber axis to create the plurality of narrow flakes comprises:
   blending the plurality of flakes in a blending device having a plurality of chopping blades until at least 75% the plurality of narrow flakes have the aspect ratio of at least 6:1.

6. The method of claim 1, wherein the unidirectional composite fiber tape comprises a unidirectional thermoplastic tape, and the plurality of narrow flakes have approximately equivalent dimensional attributes.

7. The method of claim 1, wherein the aspect ratio substantially comprises 8:1.

8. The method of claim 7, wherein the plurality of narrow flakes comprises narrow flakes of approximately ½ inches in length and approximately ¹⁄₁₆ inches in width.

9. The method of claim 1, wherein an orientation of the plurality of narrow flakes throughout the mold reservoir after said compressing of the plurality of narrow flakes within the mold reservoir comprises a substantially three-dimensionally random fiber orientation.

10. The method of claim 1, wherein the unidirectional composite fiber tape comprises a unidirectional thermoplastic tape having at least one carbon fiber reinforced resin of PEKK, PEI, PEEK, PPE, and PPS.

11. The method of claim 1, wherein the plurality of flakes have an aspect ratio of less than 2:1.

12. The method of claim 1, wherein the plurality of narrow flakes has approximately equivalent dimensional attributes.

13. A method of creating a composite component having random three-dimensional fiber orientation therethrough, the method comprising:
   slitting a composite fiber tape into a plurality of narrow tape ribbons;

cutting the plurality of narrow tape ribbons into a plurality of narrow flakes, wherein a majority of the plurality of narrow flakes has a length to width aspect ratio of 6:1 or higher;

pouring the plurality of narrow flakes into a mold reservoir, wherein each of the plurality of narrow flakes is uncoupled to adjacent ones of the narrow flakes during said pouring, and wherein the plurality of narrow flakes settle randomly in three dimensions by virtue of the aspect ratio of 6:1 or higher;

heating the plurality of narrow flakes within the mold reservoir; and compressing the plurality of narrow flakes within the mold reservoir through the mold reservoir to create the composite component, wherein the random three-dimensional orientation is maintained throughout said heating and compressing steps.

14. The method of claim 13, wherein the composite fiber tape comprises a unidirectional thermoplastic tape.

15. The method of claim 13, wherein the plurality of narrow flakes have approximately equivalent dimensional attributes.

16. The method of claim 13, wherein the plurality of narrow flakes have a plurality of dimensional attributes.

17. The method of claim 13, wherein the aspect ratio substantially comprises 8:1.

18. The method of claim 17, wherein the majority of the plurality of narrow flakes comprises narrow flakes of approximately ½ inches in length and approximately 1/16 inches in width.

19. The method of claim 13, wherein an orientation of the plurality of narrow flakes throughout the mold reservoir after said compressing of the plurality of narrow flakes within the mold reservoir comprises a substantially three-dimensionally random fiber orientation.

20. The method of claim 13, wherein the composite fiber tape comprises a unidirectional thermoplastic tape having at least one carbon fiber reinforced resin of PEKK, PEI, PEEK, PPE, and PPS.

* * * * *